United States Patent
Xu

(10) Patent No.: US 10,443,428 B2
(45) Date of Patent: Oct. 15, 2019

(54) GAS TURBINE ENGINE HAVING MINIMUM COOLING AIRFLOW

(71) Applicant: UNITED TECHNOLOGIES CORPORATION, Farmington, CT (US)

(72) Inventor: JinQuan Xu, Groton, CT (US)

(73) Assignee: United Technologies Corporation, Farmington, CT (US)

(*) Notice: Subject to any disclaimer, the term of this patent is extended or adjusted under 35 U.S.C. 154(b) by 374 days.

(21) Appl. No.: 15/111,531

(22) PCT Filed: Jan. 21, 2015

(86) PCT No.: PCT/US2015/012122
§ 371 (c)(1),
(2) Date: Jul. 14, 2016

(87) PCT Pub. No.: WO2015/126551
PCT Pub. Date: Aug. 27, 2015

(65) Prior Publication Data
US 2016/0326903 A1    Nov. 10, 2016

Related U.S. Application Data

(60) Provisional application No. 61/941,533, filed on Feb. 19, 2014.

(51) Int. Cl.
*F02C 7/14*     (2006.01)
*F02C 7/18*     (2006.01)
(Continued)

(52) U.S. Cl.
CPC .......... *F01D 17/145* (2013.01); *F01D 11/003* (2013.01); *F01D 17/105* (2013.01);
(Continued)

(58) Field of Classification Search
CPC .... F02K 3/075; F02K 3/06; F02C 7/18; F02C 7/185; F02C 7/141; F02C 6/06;
(Continued)

(56) References Cited

U.S. PATENT DOCUMENTS

| | | | | |
|---|---|---|---|---|
| 5,279,109 A | * | 1/1994 | Liu ........................ | F02C 7/052 60/39.092 |
| 5,531,566 A | * | 7/1996 | Derouet ................ | F01D 17/105 415/144 |
| 5,687,562 A | * | 11/1997 | Stewart ................. | F01D 17/105 251/304 |
| 5,775,098 A | * | 7/1998 | Philippona ............ | F01D 17/105 60/226.3 |

(Continued)

FOREIGN PATENT DOCUMENTS

JP          08144852         6/1996

OTHER PUBLICATIONS

Supplementary European Search Report for European Application No. 15751864.8 dated Feb. 16, 2017.
(Continued)

*Primary Examiner* — Alain Chau
(74) *Attorney, Agent, or Firm* — Carlson, Gaskey & Olds, P.C.

(57) ABSTRACT

A cooling system for a gas turbine engine comprises a passage capable of receiving cooling air, a compartment radially adjacent thereto and axially aligned therewith, an opening therebetween, a valve within the opening, and a heat exchanger received in the compartment. The valve is moveable between a maximum open position and a minimum open position for increasing or decreasing airflow from the passage into the compartment. At the valve minimum open position, a leakage path is provided between the passage and the compartment, whereby cooling air is capable of passing from the passage to the compartment and toward the heat exchanger at all valve positions. A gas turbine engine is also disclosed.

12 Claims, 2 Drawing Sheets

(51) Int. Cl.
| | |
|---|---|
| *F02C 9/18* | (2006.01) |
| *B64D 33/02* | (2006.01) |
| *F01D 17/14* | (2006.01) |
| *F01D 17/10* | (2006.01) |
| *F01D 25/12* | (2006.01) |
| *F01D 11/00* | (2006.01) |
| *F02C 3/04* | (2006.01) |

(52) U.S. Cl.
CPC ............... *F01D 25/12* (2013.01); *F02C 3/04* (2013.01); *F02C 7/14* (2013.01); *F02C 7/18* (2013.01); *F02C 9/18* (2013.01); *B64D 2033/024* (2013.01); *F05D 2220/32* (2013.01); *F05D 2240/35* (2013.01); *F05D 2260/213* (2013.01); *F05D 2300/514* (2013.01); *Y02T 50/675* (2013.01)

(58) Field of Classification Search
CPC ...... F02C 6/08; F02C 9/18; F02C 7/14; F02C 3/04; F01D 17/105; F01D 17/141; F01D 17/145; F01D 25/12; F01D 11/003; F05D 2260/213; F05D 2300/514; F05D 2220/32; F05D 2240/35; B64D 33/02; B64D 2033/024; F04D 27/0215; Y02T 50/675
See application file for complete search history.

(56) References Cited

U.S. PATENT DOCUMENTS

| | | | |
|---|---|---|---|
| 5,845,482 A * | 12/1998 | Carscallen | F01D 17/105 60/785 |
| 5,899,058 A | 5/1999 | Narcus et al. | |
| 6,666,433 B1 * | 12/2003 | Pierce | F16K 25/00 251/359 |
| 7,878,005 B2 * | 2/2011 | Bradbrook | F01D 19/00 60/226.1 |
| 2010/0092116 A1 * | 4/2010 | Franconi | F01D 25/125 384/317 |
| 2012/0128467 A1 | 5/2012 | Ruthemeyer | |
| 2013/0145744 A1 | 6/2013 | Lo et al. | |
| 2013/0186102 A1 * | 7/2013 | Lo | F02C 7/18 60/785 |
| 2013/0333390 A1 * | 12/2013 | Barkowsky | F01D 17/105 60/782 |
| 2014/0248133 A1 * | 9/2014 | Ebert | F01D 17/105 415/145 |

OTHER PUBLICATIONS

International Search Report and Written Opinion of PCT Application No. PCT/US2015/012122 dated May 14, 2015.
International Preliminary Report on Patentability for International Application No. PCT/US2015/012122 dated Sep. 1, 2016.

* cited by examiner

GAS TURBINE ENGINE HAVING MINIMUM COOLING AIRFLOW

CROSS-REFERENCE TO RELATED APPLICATION

This application claims priority to U.S. Provisional Patent Application No. 61/941,533, filed Feb. 19, 2014.

BACKGROUND OF THE INVENTION

This application relates to a gas turbine engine, wherein a variable volume of cooling air is passed over a heat exchanger.

Gas turbine engines are known and, typically, include a fan delivering air into a bypass duct as propulsion air. The air is also delivered into a core engine where it passes into a compressor. Compressed air is then moved into a combustion section where it is mixed with fuel and ignited. Products of this combustion pass downstream over turbine rotors driving them to rotate.

There are a number of fluids within a gas turbine engine. As an example, there is hot air in the engine, adjacent the combustor and downstream of a combustor. The prior art has provided ways of cooling this hot air, such as a heat exchanger that receives a flow of cooling air.

In addition, fuel and oil, as utilized on the gas turbine engine, may also pass to a heat exchanger where it is cooled by cooling air.

It was typically true that the cooling air was passed over these heat exchangers at all periods of operation of the associated gas turbine engine. This was somewhat inefficient, in that, the heat exchanger does not constantly need cooling.

More recently, it has been proposed to have a door which may move between open and closed positions to either block or allow flow of the cooling air across the heat exchanger. This reduces the volume air which is utilized as cooling air at times when little or no cooling air is required.

Overall, this will increase the efficiency of the associated gas turbine engine.

SUMMARY OF THE INVENTION

In a featured embodiment, a cooling system for a gas turbine engine comprises a passage capable of receiving cooling air, a compartment radially adjacent thereto and axially aligned therewith, an opening therebetween, a valve within the opening, and a heat exchanger received in the compartment. The valve is moveable between a maximum open position and a minimum open position for increasing or decreasing airflow from the passage into the compartment. At the valve minimum open position, a leakage path is provided between the passage and the compartment, whereby cooling air is capable of passing from the passage to the compartment and toward the heat exchanger at all valve positions.

In another embodiment according to the previous embodiment, the heat exchanger receives hot air from an associated gas turbine engine to be cooled by the cooling air.

In another embodiment according to any of the previous embodiments, the heat exchanger receives one of a lubricant and fuel to be cooled by the cooling air.

In another embodiment according to any of the previous embodiments, the cooling air comes from a bypass duct which receives bypass air from a fan associated with the gas turbine engine.

In another embodiment according to any of the previous embodiments, the cooling air comes from a compressor and passes into the compartment through the valve.

In another embodiment according to any of the previous embodiments, the valve is moveable to at least a third position in addition to the more open and less open positions as controlled by the control.

In another embodiment according to any of the previous embodiments, the leakage path is provided by a controlled leakage.

In another embodiment according to any of the previous embodiments, the valve has at least one hole to provide the leakage path across the valve.

In another embodiment according to any of the previous embodiments, the valve sits on a seal, and provides the leakage path.

In another embodiment according to any of the previous embodiments, the valve is formed at least in part of a porous material to provide the leakage path.

In another embodiment according to any of the previous embodiments, the control moving the valve through an actuator.

In another featured embodiment, a gas turbine engine comprises a compressor. A fan delivers air into a bypass duct and into the compressor. The compressor delivers air into a combustion section. A turbine section is downstream of the combustor. A passage is capable of receiving cooling air, a compartment radially adjacent thereto and axially aligned therewith, an opening therebetween, a valve within the opening, and a heat exchanger received in the compartment. The valve is moveable between a maximum open position and a minimum open position for increasing or decreasing airflow from the passage into the compartment. At the valve minimum open position, a leakage path is provided between the passage and the compartment, whereby cooling air is capable of passing from the passage to the compartment and toward the heat exchanger at all valve positions.

In another embodiment according to the previous embodiment, the heat exchanger receives hot air from an associated gas turbine engine to be cooled by the cooling air.

In another embodiment according to any of the previous embodiments, the heat exchanger receives one of a lubricant and fuel to be cooled by the cooling air.

In another embodiment according to any of the previous embodiments, the cooling air comes from the bypass duct.

In another embodiment according to any of the previous embodiments, the cooling air comes from the compressor and passes into the compartment through the valve.

In another embodiment according to any of the previous embodiments, the valve is moveable to at least a third position in addition to the more open and less open positions as controlled by the control.

In another embodiment according to any of the previous embodiments, the leakage path is provided by a controlled leakage.

In another embodiment according to any of the previous embodiments, the valve has at least one hole to provide the leakage path across the valve.

In another embodiment according to any of the previous embodiments, the valve sits on a seal. The seal provides the leakage path.

In another embodiment according to any of the previous embodiments, the valve is formed at least in part of a porous material to provide the leakage path.

In another embodiment according to any of the previous embodiments, the control moves the valve through an actuator.

These and other features may be best understood from the following drawings and specification.

DETAILED DESCRIPTION

Figure 1:
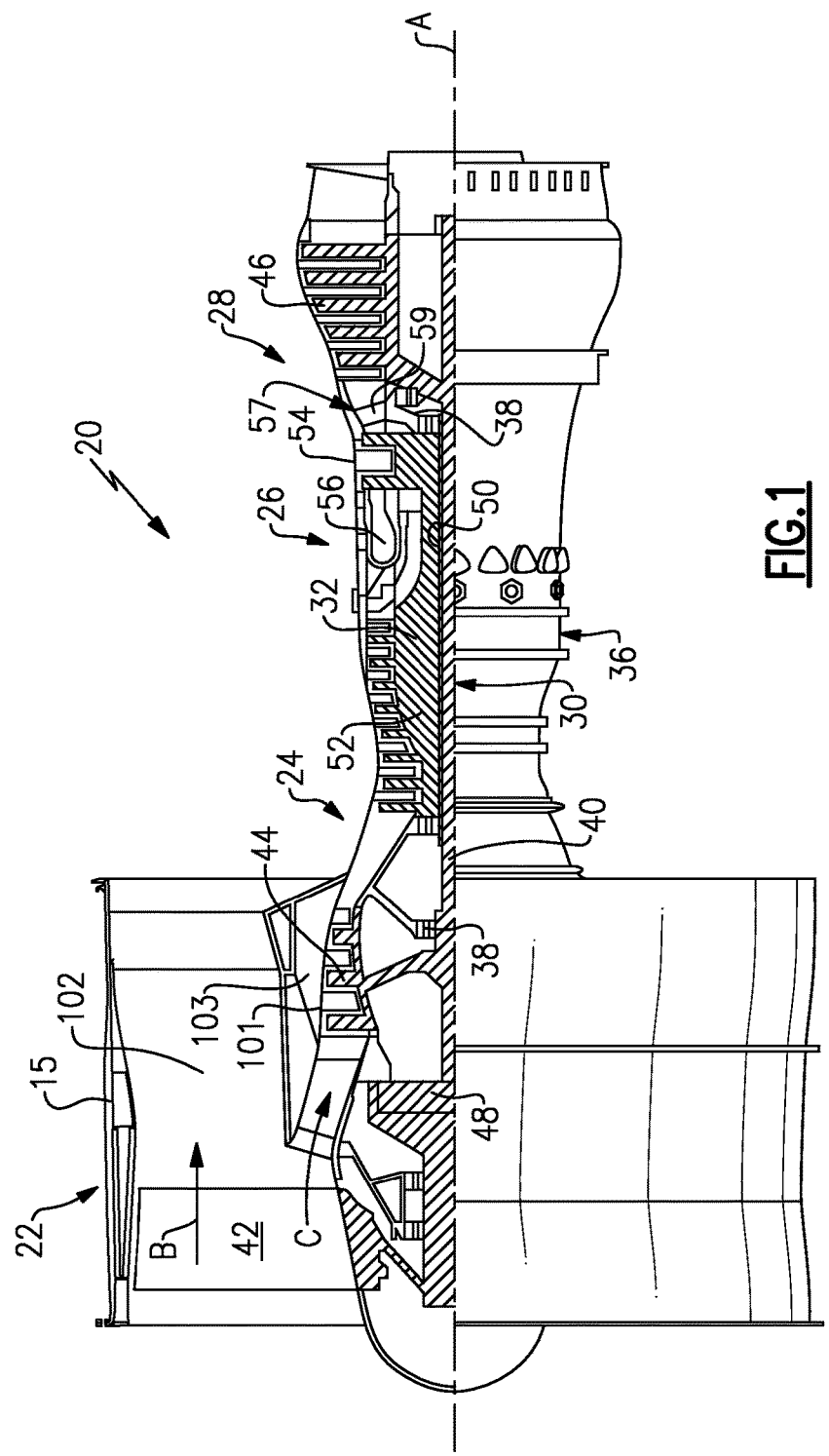
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The location of bypass duct 102, chamber 103 and housing 101 are shown schematically in FIG. 1.

Figure 2A:
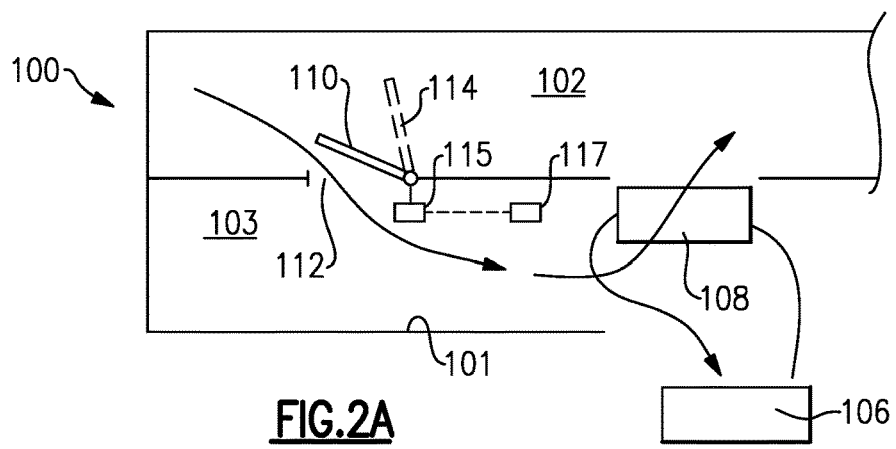
FIG. 2A shows a first embodiment.

FIG. 2A shows a bypass duct 102 receiving bypass air. An engine chamber 103 outwardly of an engine core housing 101 selectively receives cooling air through an opening 112. The volume of cooling air passing through the opening 112 is regulated by a valve 110 that functions like a door. The door 110 is driven by an actuator 115, which may communicate with a control shown schematically at 117, to move, such as pivot the door 110. As an example, a position 114 is shown in phantom where the door 110 is moved to a more open position to increase the flow of cooling air. The cooling air moving through the opening 112 from the duct 102 passes across a heat exchanger 108. The heat exchanger 108 may be an air to air heat exchanger and may cool hot engine air from an engine compartment 106, such as from adjacent the combustor 56.

Alternatively, 106 may circulate hot lubricant or fuel to be cooled by the air at heat exchanger 108. Of course, other fluids may be cooled.

The cooling load on the heat exchanger 108 will not be constant during operation of the associated gas turbine engine. Thus, the control 117 may move the door 110 between fully opened (114) and more closed (110) positions to limit the airflow. However, in this embodiment, the door 110 is never fully closed. The door 110 has a most closed position 110 which will allow some airflow. As an example, the door may move to a most closed position 110 where it still allows 0.1%-5% of the volume of air that it would allow in its fully opened position 110 as shown at 114.

Figure 2B:
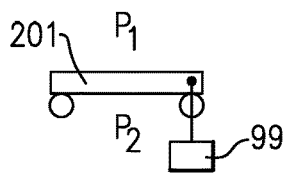
FIG. 2B shows a problem with the prior art.

FIG. 2B shows a problem with the prior art which fully closed the door 201. In FIG. 2B, a pressure P1 exists on one side of the door 201 and a pressure P2 exists on the opposed side. The P1 pressure may be much different than the P2 pressure and, thus, an actuator 99 for the door 201 must overcome this pressure difference to move the door 201 to its open position. This is somewhat undesirable.

In the FIG. 2A embodiment 100, since the door 110 is never fully closed, this pressure differential will not present a challenge to the actuator 115, which can thus be smaller.

Figure 3:
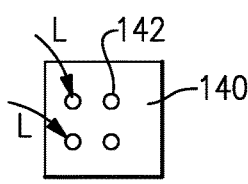
FIG. 3 shows a second embodiment.

FIG. 3 shows another embodiment 140 wherein one or a plurality of holes 142 are formed through a door 140. Thus, leakage air L will leak through the holes 142, such that the pressure differential will not occur. Again, actuator 115 will not have to overcome such a large pressure differential.

Figure 4A:
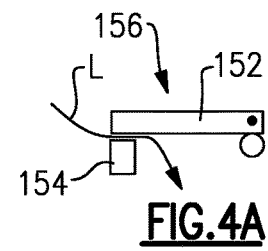
FIG. 4A shows a third embodiment.
Figure 4B:
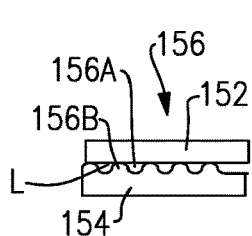
FIG. 4B shows another view of the third embodiment.

FIG. 4A shows an embodiment 156 wherein a door 152 sits on a seal 154 that has a controlled leakage as shown at L. FIG. 4B shows that the seal 154 may have a plurality of, for example, arcuate grooves 156A projecting away from the door facing edge of the seal 154, and ridges 156B forming the door facing edge of the seal 154, and capable of being disposed against the door 152, which together function as openings to provide the controlled leakage L.

Figure 5:
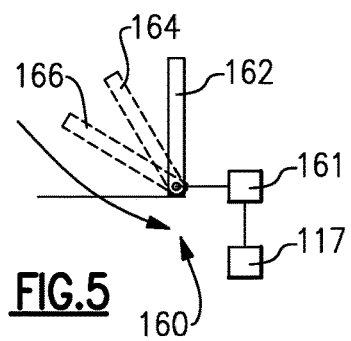
FIG. 5 shows yet another embodiment.

FIG. 5 shows a door embodiment 160. Here, the door 160 is shown pivoting to several positions 162, 164, 166, all driven by an actuator 161 communicating with a control 117. A control 117 may choose the particular position based upon any number of engine conditions. By having more than two positions, finer control over the volume of air allowed to pass across the heat exchanger may be achieved.

Figure 6:
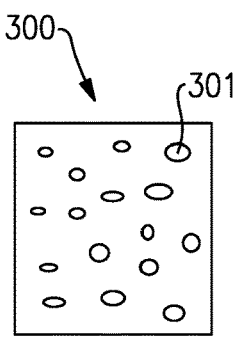
FIG. 6 shows yet another embodiment.

FIG. 6 shows another door embodiment 300 wherein the door 300 is formed at least in part of a porous material, such that there are porous passages 301 (shown schematically) that allow air to pass across the door 300.

Figure 7:
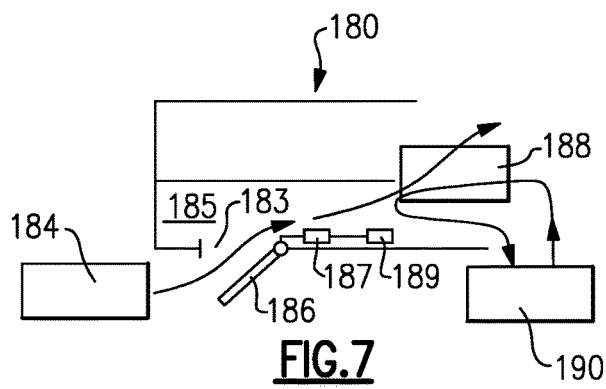
FIG. 7 shows yet another embodiment.

FIG. 7 shows yet another embodiment 180, wherein air from a compressor 184 passes through an opening 183 controlled by a door 186 into the chamber 185. Air in the chamber 185 passes across a heat exchanger 188 that receives a fluid to be cooled from an engine area 190. The door 186 is driven by an actuator 187 which is controlled by a control 189.

In sum, in the disclosed embodiments, a control controls the volume of cooling air passing into a compartment and across a heat exchanger. The control moves a door through an actuator. The door is movable between a more open position and a less open position, but will always allow a minimal amount of cooling air into the compartment. In the embodiments of FIGS. 2A and 5, the "less open position" would still remain away from a seat such that there is air passing into the compartment. In the FIGS. 3, 4A/B, and FIG. 6 embodiments, there is a controlled leakage across the door, even though the door is nominally "closed." It should be understood the FIG. 7 embodiment can utilize any one of the doors of FIG. 2A, 3, 4A/B, or 5.

While the valves are shown as door-like members, other valve types would come within the scope of this disclosure. Also, the 0.1%-5% allowed percentages, as mentioned in paragraph [0049] applies to all embodiments.

Stated another way, a cooling system for a gas turbine engine comprises a passage (102/184) capable of receiving cooling air, and a compartment radially adjacent thereto and axially aligned therewith (103, 185). An opening between the component and passage has a valve. A heat exchanger is received in the compartment. The valve is moveable between a maximum open position and a minimum open position for increasing or decreasing airflow from the passage into the compartment. At said valve minimum open position, a leakage path is provided between the passage and the compartment, whereby cooling air is capable of passing from the passage to the compartment and toward the heat exchanger at all valve positions. Reference to the leakage path should be interpreted to cover various types of air flow openings and/or conduits, enabling airflow between adjacent engine chambers, including but not limited to the above disclosed embodiments. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A cooling system for a gas turbine engine comprising:
   a passage capable of receiving cooling air, a compartment radially adjacent to the passage and axially aligned with the passage, an opening formed between the passage and the compartment, a valve within the opening, and a heat exchanger received in the compartment;
   said valve being moveable between a maximum open position and a minimum open position for increasing or decreasing airflow from the passage into the compartment;
   at said valve minimum open position, a leakage path is provided between the passage and the compartment, whereby cooling air is capable of passing from the passage to the compartment and toward the heat exchanger at all valve positions;
   wherein said leakage path is provided by a controlled leakage; and
   wherein said valve sits on a seal, and said seal providing the leakage path, wherein said seal having ridges and grooves to form said leakage path.

2. The cooling system as set forth in claim 1, wherein said heat exchanger receiving hot air from an associated gas turbine engine to be cooled by the cooling air.

3. The cooling system as set forth in claim 1, wherein said heat exchanger receiving one of a lubricant and fuel to be cooled by said cooling air.

4. The cooling system as set forth in claim 1, wherein said cooling air comes from a bypass duct which receives bypass air from a fan associated with the gas turbine engine.

5. The cooling system as set forth in claim 1, wherein said cooling air comes from a compressor and passes into said compartment through said valve.

6. The cooling system as set forth in claim 1, wherein a control moves said valve through an actuator.

7. A gas turbine engine comprising:
   a compressor, a fan delivering air into a bypass duct and into said compressor, said compressor for delivering air into a combustion section, and a turbine section downstream of said combustion section; and a passage capable of receiving cooling air, a compartment radially adjacent to the passage and axially aligned with the passage, an opening formed between the passage and the compartment, a valve within the opening, and a heat exchanger received in the compartment, said valve being moveable between a maximum open position and a minimum open position for increasing or decreasing airflow from the passage into the compartment;

at said valve minimum open position, a leakage path is provided between the passage and the compartment, whereby cooling air is capable of passing from the passage to the compartment and toward the heat exchanger at all valve positions;

wherein said leakage path is provided by a controlled leakage;

wherein said valve sits on a seal, and said seal providing the leakage path, wherein said seal having ridges and grooves to form said leakage path.

8. The gas turbine engine as set forth in claim 7, wherein said heat exchanger receiving hot air from an associated gas turbine engine to be cooled by the cooling air.

9. The gas turbine engine as set forth in claim 7, wherein said heat exchanger receiving one of a lubricant and fuel to be cooled by said cooling air.

10. The gas turbine engine as set forth in claim 7, wherein said cooling air comes from said bypass duct.

11. The gas turbine engine as set forth in claim 7, wherein said cooling air comes from said compressor and passes into said compartment through said valve.

12. The gas turbine engine as set forth in claim 7, wherein a control moves said valve through an actuator.

* * * * *